No. 711,304. Patented Oct. 14, 1902.
S. GEORGE.
VALVE.
(Application filed Mar. 21, 1902.)
(No Model.)

Witnesses. Inventor:

UNITED STATES PATENT OFFICE.

SAMUEL GEORGE, OF STOUFFVILLE, CANADA.

VALVE.

SPECIFICATION forming part of Letters Patent No. 711,304, dated October 14, 1902.

Application filed March 21, 1902. Serial No. 99,351. (No model.)

*To all whom it may concern:*

Be it known that I, SAMUEL GEORGE, manufacturer, of the village of Stouffville, in the county of York, in the Province of Ontario, Canada, have invented certain new and useful Improvements in Valves, of which the following is a specification.

My invention relates to improvements in valves; and the object of the invention is to devise a simple, durable, and readily-adjusted valve capable of withstanding a maximum pressure and in which the wear is minimized and in which the pressure is directed evenly on the center of the valve, and consequently the wear is reduced to a minimum, and which may be easily and cheaply repaired if by any possibility it should get out of order; and it consists, essentially, of a valve-casing having a central L-shaped partition, a substantially cylindrical seat provided with a flange and suitably screwed into a correspondingly-threaded orifice in said partition, a substantially cylindrical-shaped cup of greater diameter than the cylindrical seat held evenly on the seat by means of guiding-ribs, and a screw-cap designed to fit over the valve and close the valve-casing, the parts being constructed and arranged in detail as hereinafter more particularly explained.

Figure 4:
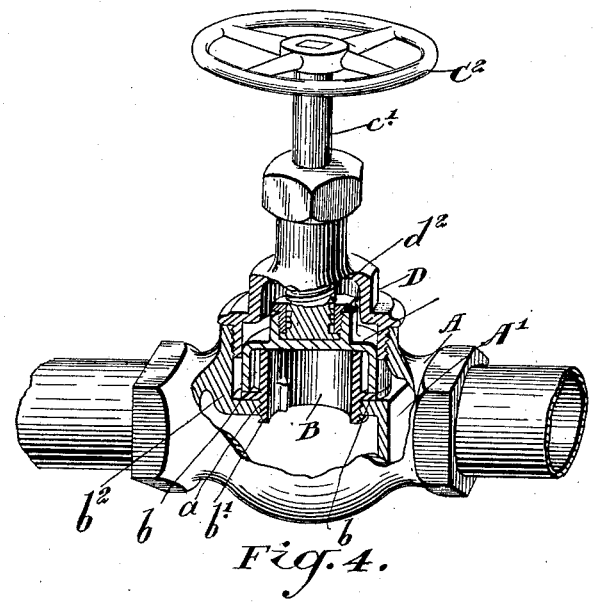
Figure 1:
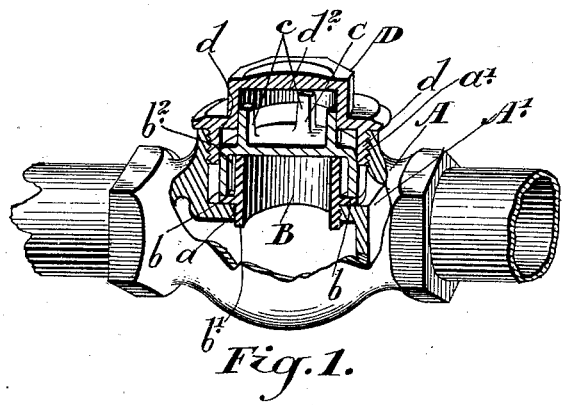
Figure 2:
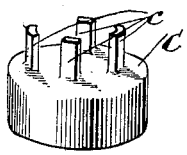
Figure 3:
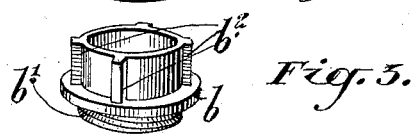

Figure 1 is a perspective view, mostly in section, showing the approved form of valve used as a check-valve. Fig. 2 is a detail of the valve. Fig. 3 is a detail of the seat. Fig. 4 is a similar view to Fig. 1, showing the stem-actuated valve, or more commonly called the "globe-valve."

In the drawings like letters of reference indicate corresponding parts in each figure.

A is the valve-casing, and A' the partition thereof, which is of the usual form, being L-shaped in longitudinal section.

$a$ is a circularly-threaded orifice in the longitudinal portion of the partition.

B is the valve-seat, which is substantially cylindrical in form and provided with a flange $b$. The lower end $b'$ of the cylindrical seat B is threaded and designed to be screwed home into the threaded opening $a$.

$b^2$ represents guiding-ribs extending longitudinally of the cylindrical valve-seat, as indicated in Fig. 3.

C is the valve, which is of a substantially cylindrical cup form, being of a greater diameter than the valve-seat, the internal periphery being designed to fit snugly the ribs $b^2$ and the outer periphery being designed to be preferably, though not necessarily, substantially flush with the edge of the flange $b$.

$c$ represents a series of upwardly-extending guiding-lugs, which are concentric to the axis of the valve.

D is the screw-cap of the valve, which is provided with the usual nut-shaped head and depending flange $d$, which is internally threaded and fits within the correspondingly-threaded orifice $a'$ of the valve-casing. The internal periphery of the flange fits snugly around the valve, so as to permit of a perfectly-free movement of such valve.

$d^2$ is a circular recess in the head of the cap, within which the lugs $c$ extend, the outside of such lugs fitting closely the wall of the recess. The lugs $c$ are not only guiding-lugs, but are intended to limit the upward movement of the valve.

The form I have now described is a check-valve, and it will be readily seen that the pressure of the water underneath the center will raise the valve and pass up over the top of the cylindrical seat and down around the valve between the ribs $b^2$ and the inner periphery of the valve and the outer periphery of the valve-seat and out between the lower edge of the valve and the flange $b$. When the pressure is relieved, of course, the valve immediately becomes seated again against any back pressure.

It will be seen from the form of valve that I have described that the guiding-ribs $b^2$ so separate the interior periphery of the valve and the outer periphery of the valve-seat that a sufficient space is provided when the valve is raised for the free passage of the water. The ribs $b^2$ serve to keep the valve centrally situated and also provide for even wear, as also do the ribs $c$, which extend upwardly into the recess $d^2$.

It will now be understood from what has been described that there is no unbalanced side pressure upon the valve; but such pressure is always in the center, and consequently the wear and tear is reduced to a minimum. In fact, there is nothing to prevent my valve from wearing indefinitely.

In Fig. 4 I have shown the stem-operated valve, in which I have dispensed with the upwardly-extending lugs c and provide a stem c', which is connected in any suitable manner to the top of the valve. Such valve-stem is threaded, and by turning the hand-wheel $C^2$ the valve may be raised and lowered as desired.

It will be seen from the construction of my valve that not only may the valve be easily cleaned, but the seat is also readily removable without any trouble, and consequently if there should be any possibility of wear such valve is easily and cheaply repaired.

Although I show only two forms of my valve, it will, of course, be understood that there are various forms which may be adopted, depending upon the purpose to which my valve is applied, without departing from the spirit of my invention.

What I claim as my invention is—

1. In a valve, the combination with the valve-casing and partition thereof provided with a central orifice, of a cylindrically-formed valve-seat suitably held therein, a cylindrical cup-shaped valve fitting over the valve-seat and of an interior greater diameter than the outside diameter of the valve-seat and ribs located between the interior of the valve and the valve-seat as and for the purpose specified.

2. In a valve, the combination with the valve-casing and partition provided with a central orifice, of a cylindrical valve-seat held therein, a cylindrical cup-shaped valve resting over the valve-seat, guide-ribs between the valve and valve-seat, a screw-cap fitting over the valve and having a depending flange embracing the outer periphery of the cylindrical valve, said cap having a reduced upper cylindrical portion, and guiding-lugs extending upwardly from the upper side of the valve in contact with the wall of said reduced portion, substantially as described.

3. The combination with the valve and central partition thereof provided with a threaded orifice, of a cylindrical valve-seat provided with a threaded lower end and an external flange and guiding-ribs formed on the exterior periphery of the seat, and a cylindrical cup-shaped valve having the internal periphery fitting the ribs closely, and a suitable closing-cap for the valve as and for the purpose specified.

4. In a valve, a valve-seat comprising a cylindrical portion having a threaded lower end designed to screw into a corresponding hole in the partition and a central flange and a reduced upwardly-extending portion having guiding-ribs as specified.

SAMUEL GEORGE.

Witnesses:
B. BOYD,
L. TRIMBLE.